United States Patent
Birkemose et al.

(10) Patent No.: US 8,162,608 B2
(45) Date of Patent: Apr. 24, 2012

(54) WIND TURBINE, YAW SYSTEM CONTROLLER AND YAW SYSTEM FOR A WIND TURBINE AND METHOD OF REDUCING THE LOADS ACTING ON SUCH A YAW SYSTEM

(75) Inventors: Bo Birkemose, Brande (DK); Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 897 days.

(21) Appl. No.: 12/283,058

(22) Filed: Sep. 9, 2008

(65) Prior Publication Data

US 2009/0068013 A1    Mar. 12, 2009

(30) Foreign Application Priority Data

Sep. 12, 2007    (EP) .................................. 07017912

(51) Int. Cl.
  *F03D 7/02*    (2006.01)
(52) U.S. Cl. .................. 416/31; 416/1; 416/24; 416/37; 416/41
(58) Field of Classification Search .................. 416/1, 31, 416/37, 24, 41
  See application file for complete search history.

(56) References Cited

U.S. PATENT DOCUMENTS

| | | | |
|---|---|---|---|
| 4,201,514 A | | 5/1980 | Huetter |
| 4,297,076 A | * | 10/1981 | Donham et al. ................ 416/37 |
| 4,298,313 A | * | 11/1981 | Hohenemser ................... 416/98 |
| 4,966,525 A | | 10/1990 | Nielsen |
| 5,035,575 A | | 7/1991 | Nielsen et al. |
| 2006/0002792 A1 | * | 1/2006 | Moroz et al. ..................... 416/1 |

FOREIGN PATENT DOCUMENTS

| | | |
|---|---|---|
| EP | 0 945 613 A2 | 9/1999 |
| EP | 0995904 A2 | 4/2000 |
| EP | 1 612 413 A2 | 1/2006 |
| JP | 8082277 A | 3/1996 |

OTHER PUBLICATIONS

Caselitz P. et al: Reduction of Fatigue Loads on Wind Energy Converters by Advanced Control Methods; European Wind Energy Conference, XX, XX, Oct. 1997, p. 555-558; XP008031751; Others; 1997.
Bossanyi, E.: Individual Blade Pitch Control for Load Reduction; in: Wind Energy, Wiley, Chichester, GB; vol. 6, Oct. 8, 2002, p. 119-128; Magazine; 2002; GB.

* cited by examiner

*Primary Examiner* — Jerome Jackson, Jr.
*Assistant Examiner* — David Spalla

(57) ABSTRACT

Wind turbine, yaw system controller and yaw system for a wind turbine and method of reducing the loads on such a yaw system.

A method for reducing the loads acting on a wind turbine yaw system (19) due to yawing moments which are induced to the yaw system (19) by a rotor which comprises at least one rotor blade with a pitch control system is provided. In the method, the yawing moment which is induced to the yaw system (19) by the rotor is determined and the pitch of the at least one rotor blade is set based on the detected yawing moment such that the determined yawing moment is reduced.

15 Claims, 6 Drawing Sheets

WIND TURBINE, YAW SYSTEM CONTROLLER AND YAW SYSTEM FOR A WIND TURBINE AND METHOD OF REDUCING THE LOADS ACTING ON SUCH A YAW SYSTEM

CROSS REFERENCE TO RELATED APPLICATIONS

This application claims the benefits of European application No. 07017912.2 filed Sep. 12, 2007 and is incorporated by reference herein in its entirety.

FIELD OF INVENTION

The present invention relates to a method of reducing the torque acting on a wind turbine yaw system, in particular on at least one yaw drive, due to yawing moments which are induced to the yaw system by a rotor. In addition, the invention relates to a yaw system controller and a yaw system for a wind turbine as well as to a wind turbine.

BACKGROUND OF THE INVENTION

Due to turbulence and other flow irregularities the wind turbine rotor experiences large yawing moments. In trying to orient the rotor to the wind the yaw system of a wind turbine has to overcome these large yawing moments in addition to any friction in the yaw bearing. When trying to retain the rotor in its correctly oriented position the yaw system is exposed to large oscillating loads.

The mechanical systems for yawing a wind turbine generally consist of a gearing ring or the like which is usually fixed to the tower and of a drive system which is usually fixed to the bottom side, i.e. the bedplate, of a nacelle of the wind turbine. The drive system typically consists of a number of gear motors each having an output shaft with a pinion that engages with the gearing ring. The motors are typically electrical motors but may also be hydraulic motors.

The yaw drive system may be rated to drive the yawing movement of the nacelle under all conditions. However, on large wind turbines this means that the yaw drive system has to be of very substantial dimensions since turbulence eddies or other flow irregularities may occasionally give rise to very large yawing moments on the turbine rotor and hence the nacelle. Therefore, in modern wind turbines the yaw drive system is usually rated to provide a yawing moment that is adequate under all usual operating conditions, and it is accepted that occasionally occurring turbulence eddies or other flow irregularities will cause the yawing moments on the turbine rotor to exceed the capacity of the yaw drive system for short periods of time. In such situations the yaw drive system cannot carry out yawing in a desired direction and may even be forced backwards in the opposite direction. Even if it is accepted that a yaw drive system is not rated for the worst case scenarios such a system tends to be large, heavy and expensive.

When the turbine has been oriented to the wind the large yawing moments which occur on the wind turbine rotor will tend to move the rotor out of alignment with the wind. Such movement may have the character of a rocking or oscillating movement that gradually increases misalignment between the rotor shaft and the wind direction. It may also be of a more unilateral direction in which case the yaw system may quickly slide to one side.

In the past, such gradual or sudden misalignments were prevented by using yaw drive systems with built in brakes which either passively brake the yaw system, for example by self-locking worm gears or spring tensioned friction brakes, or actively brake the gear system in the form of electromagnetic or hydraulic friction brakes or in the form of electromagnetic or hydraulic motor brakes. However, these arrangements cause two difficulties. At first, the unavoidable play in the gearing between the geared ring fixed to the tower and the pinions of the yaw drives may cause an oscillating movement and lead to a hammering of the gear mesh which is detrimental to the geared parts. Secondly, the yaw drives will have to be rated to absorb the highest yawing moment peaks.

Various brake systems have been proposed. One example can be seen in Japanese patent application JP-A-08082277 which discloses a hydraulic brake joined to the frame of the nacelle which acts on a disc joined to the tower.

Further examples are described in U.S. Pat. Nos. 4,966,525 and 5,035,575 in which two yaw drives are used. When the rotor shaft is aligned with the wind and the yaw system is desired to be stationary the two drives act in the opposite rotational direction, thereby locking the yawing system up to a certain well defined capacity that is determined by the electronic drive arrangement. When yawing is desired, the two yaw drive act in the same direction.

European patent EP 0 945 613 B1 discloses a yawing system where the machine frame in the nacelle rotates on a ball bearing relative to the tower. It includes a continuous passive braking system preventing the motor from being forced to operate due to small gusts of wind. To this end, it comprises friction plates on the frame which are pushed against a supporting ring in the tower on which the frame rotates by means of springs. These plates can be placed in the upper track or in the lower track of the ring, or in a radial direction on a cylindrical surface joined to the tower. The braking force is passive, i.e. it is adjusted during the assembly of the nacelle, and the braking is always operating either against small gusts of wind or against the desired movement of the orientation of the rotor. Electrically driven disc braking devices are also described in EP 0 945 613 B1.

SUMMARY OF INVENTION

With respect to the mentioned state of the art it is an objective of the present invention to provide a method of reducing the loads acting on a wind turbine yaw system due to yawing moments which are induced to the yaw system by a rotor. It is a further object of the present invention to provide an improved yaw system controller and a yaw system for a wind turbine. It is a still further objective of the present invention to provide an improved wind turbine.

The first objective is solved by a method of reducing the loads acting on at least one yaw drive of a wind turbine yaw system due to yawing moments which are induced to the yaw system by a rotor. The further objective is solved by a yaw system for a wind turbine as claimed in. The still further objective is solved by a wind turbine. The depending claims contain further developments of the invention.

The invention provides a method of reducing the loads acting on a wind turbine yaw system in particular on at least one yaw drive of the wind turbine yaw system, due to yawing moments which are induced to the yaw system by a rotor which comprises at least one rotor blade with a pitch control system. In the method, the yawing moment induced to the yaw system by the rotor is determined, for example, from a yaw system observable and the pitch of the at least one rotor blade is set based on the detected yawing moment such that the determined yawing moment is reduced.

The basic principle of the invention is to use the individual pitching of the at least one rotor blade to reduce the yawing moments from the wind turbine rotor and using the yaw drive system to detect the magnitude of the yawing moments to be reduced. By basing the application of individual pitching of the at least one rotor blade on direct measurement of the reactions or movements observed in the yaw system, it is possible to minimise the loading on the yaw system. As a result, the difficulties presented in the yaw system solutions of the state of the art are minimised. The dimensions and costs of the yaw system can be reduced, excessive loads are eliminated and no yaw brake system is required. Yaw brake systems may nonetheless be present. However, these yaw brake systems can be dimensioned much smaller than in the state of the art.

Generally, the rotors of modern wind turbines are equipped with more than one rotor blade, usually with three rotor blades although two-bladed rotors can also be found. In the case of at least two rotor blades, the pitch of each rotor blade of the rotor may be individually set to reduce the yawing moment determined through the yaw system.

In order not to provoke excessive control action, it is possible to set the pitch of the at least one rotor blade based on the detected yawing moment only when the detected yawing moment exceeds a predefined value. The control system would then not set any pitch in order to reduce the loads acting on the yaw drives unless the predefined value is exceeded. If the predefined value is not exceeded a braking torque can be provided by the yaw drives or a braking friction can be provided by a friction brake. Since the torque which is to be handled by the yaw drives and/or the friction brake are rather small, i.e. below the predefined value, the braking can be done with yaw drives and/or friction brakes having small dimensions.

In a particular implementation of the inventive method, the yaw system is kept aligned by providing torques by at least two yaw drives where the torques act in opposite directions. The yawing moment induced to the yaw system is then determined using the difference between the torques provided by the yaw drives. If the yaw drives are electrical drives the torques provided by the yaw drives can be determined from the electrical power needed by the yaw drives for providing the torques. The electrical power can easily be measured and thus provides an easily accessible measure for the yaw moment acting on the yaw system. In case the two or more yaw drives are hydraulic drives, which are each provided with a hydraulic fluid input and a hydraulic fluid output, the torques provided by the yaw drives can be determined using the difference in the hydraulic pressure at the hydraulic fluid input and the hydraulic pressure at the hydraulic fluid output which is needed by the respective yaw drive for providing the respective torque. Like the electrical power for the electrical drives, the input and output pressure of a hydraulic drive depends on the torque to be provided by the drive and hence is an easily accessible measure for the yawing moment acting on the yaw system.

In a further implementation of the inventive method the at least one yaw drive provides a retaining torque for keeping the yaw system aligned, i.e. to counteract the yawing moment. The yawing moment induced to the yaw system is then determined from the retaining torque which is necessary to keep the yaw system aligned. In case the yaw drive is an electrical drive, the retaining torque provided by the at least one yaw drive may be determined from the electrical power needed by the yaw drive for providing the retaining torque. The electrical power needed for the retaining torque to keep the yaw system aligned is an easily accessible measure for the yawing moment acting on the yaw system. In case the at least one yaw drive is a hydraulic drive provided with a hydraulic fluid input and a hydraulic fluid output the retaining torque provided by the at least one yaw drive may be determined from the difference in the hydraulic pressure at the hydraulic fluid input to the hydraulic pressure at the hydraulic fluid output which is needed by the yaw drive for providing the retaining torque. The pressure difference provides an easily accessible measure for the yawing moments which have to be counteracted by the retaining torque.

In a still further implementation of the inventive method the yaw system is kept aligned by providing a retaining friction. In this case the yawing moment induced to the yaw system is determined by determining the retaining friction which is necessary to keep the yaw system aligned. If the retaining friction is provided by an electromagnetic friction brake the retaining friction provided by the brake may be determined from the electrical power needed by the electromagnetic friction brake to provide the retaining friction. The electrical power needed for providing the retaining friction provides an easily accessible measure for the yawing moments acting on the yaw system. If the retaining friction is provided by a hydraulic friction brake, the retaining friction provided by the brake may be determined by the hydraulic pressure needed by the hydraulic friction brake to provide the retaining friction. Again, the hydraulic pressure needed by the friction brake provides an easily accessible measure for the yawing moments acting on the yaw system.

In a still further implementation of the inventive method the yaw drive provides a constant retaining torque or a friction brake provides a constant retaining friction. The yawing moment induced to the yaw system is then determined using a change in the yaw angle or the yaw speed while the constant retaining torque is provided by the yaw drive or the constant retaining friction is provided by the friction brake. In this implementation, passive friction brakes would be sufficient. Like the electrical power or the hydraulic pressure a change in the yaw angle is easily accessible. With the constant retaining torque or the constant retaining friction a change in the yaw angle would occur if the yaw moment acting on the yaw system exceeds the constant retaining torque or the constant retaining friction. The more the yaw moment exceeds the retaining torque or the retaining friction the faster the change in the yaw angle takes place. Therefore, detecting the change in the yaw angle, in particular the speed of such change, provides an easily accessible measure for the yawing moments acting on the yaw drive and exceeding the retaining torque or retaining friction.

In addition, an inventive yaw system controller for a wind turbine is provided where the wind turbine comprises a rotor with at least one rotor blade, in particular, with two or three rotor blades, a pitch drive for setting the pitch of the at least one rotor blade as well as a pitch controller, and at least one yaw drive. The yaw system controller comprises a yaw drive load controller with an error signal input for receiving an error input signal and a yaw drive load controller output. The error input signal, which may be derived by a suitable means from a yaw system observable, represents a yawing moment induced to the yaw system by the rotor. The yaw drive load controller is adapted to determine and to output a horizontal pitch signal through the yaw drive load controller output to the pitch controller of a wind turbine. The horizontal pitch signal is based on the error input signal and represents a pitch to be set by the pitch drive of the at least one rotor blade such as to reduce a yawing moment induced to the yaw system by the rotor. The term "horizontal pitch signal" is chosen to distinguish this pitch signal from pitch signals which are used for reducing the load acting on the rotor.

With the inventive yaw system controller the inventive method can be realised. Therefore, the yaw system controller provides the advantages which have already been described in conjunction with the inventive method. In particular, with the yaw system controller of the invention the wind turbine yaw system may be equipped with yaw drives that are dimensioned smaller than in the state of the art. The same is true for many other components of the yaw system such as, for example, a geared ring or the like or optional friction brakes.

The inventive yaw system controller may further comprise a yaw drive controller which is adapted to determine and to output a drive torque signal representing a torque to be provided by the yaw drive. The yaw drive controller comprises a yaw speed controller with a yaw speed controller output, the yaw speed controller being adapted to determine and to output a torque reference signal through the yaw speed controller output. A yaw torque controller of the yaw system controller which is connected to the yaw speed controller output to receive the torque reference signal is adapted to determine said drive torque signal from said torque reference signal. The error signal input of the yaw drive load controller is connected to the yaw speed controller output for receiving the torque reference signal as the error input signal. This implementation of the inventive yaw system allows the yawing moment to be determined and the resulting horizontal pitch signal based on a torque or retaining torque to be provided by a yaw drive in order to avoid misalignment of the horizontal rotor axis to the wind direction.

The yaw system controller may optionally comprise a friction brake controller for controlling the friction to be provided by a friction brake in order to keep the horizontal rotor axis aligned to the wind direction. The friction brake controller comprises a friction brake controller output and is adapted to determine and to output a friction signal through the friction brake controller output to a friction brake. The friction signal represents a friction to be provided by the friction brake. The error signal input of the yaw drive load controller is then connected to the friction brake controller output for receiving the friction signal as the error input signal. In this implementation of the inventive yaw system the yawing moment acting on the yaw system can be determined from the retaining friction to be provided by the friction brake to counteract the yaw moment.

In the inventive yaw system controller the error signal input of the yaw drive load controller may alternatively be designed to receive a yaw speed signal from a yaw speed detector as the error input signal. In this implementation of the inventive yaw system the yawing moment acting on the yaw system can be determined from the speed of change of the yaw angle, in particular if a constant retaining torque or a constant retaining friction is applied to the yaw system.

An adequate horizontal pitch signal can be produced by the yaw drive load controller if it comprises a PI controller, i.e. a controller with a proportional element and an integral element. The proportional element then provides part of the horizontal pitch signal which is suitable for counteracting short term oscillations while the integral element provides part of the horizontal pitch signal which is adequate for cancelling low frequency loads.

An inventive yaw system comprises at least one yaw drive and an inventive yaw drive controller. It allows for realising the advantages discussed with respect to the inventive method and the inventive yaw system controller. The yaw drive may either be an electric drive or a hydraulic drive.

The yaw system may further comprise at least one friction brake which may either be an electromagnetic brake or a hydraulic brake. Moreover, the yaw system may also comprise at least one yaw speed sensor.

An inventive wind turbine comprises a rotor with at least one rotor blade, in particular with two or three rotor blades, a pitch drive for setting the pitch of the at least one rotor blade and a pitch controller. The inventive wind turbine further comprises an inventive yaw system in which the pitch controller is connected to the yaw drive load controller output of the yaw system for receiving the horizontal pitch signal. The advantages which are achieved with the inventive wind turbine result from the advantages of the inventive yaw system. If the rotor includes two or more rotor blades, the pitch controller is advantageously capable of setting the pitch of each rotor blade individually.

The pitch controller of the inventive wind turbine may further be connected to a rotor load detecting device for receiving a rotor load signal representing the load acting on the rotor. In this case, the pitch controller is adapted to control the pitch of the at least one rotor blade based on the horizontal pitch signal and the rotor load signal. In this implementation of the wind turbine, the pitch of the at least one rotor blade can be set so as to minimise the yaw moment acting on the yaw system and, at the same time, to minimise the loads acting on the rotor.

BRIEF DESCRIPTION OF THE DRAWINGS

Further features, properties and advantages of the invention will become clear from the following description of embodiments in conjunction with the accompanying the drawings.

DETAILED DESCRIPTION OF INVENTION

Figure 1:
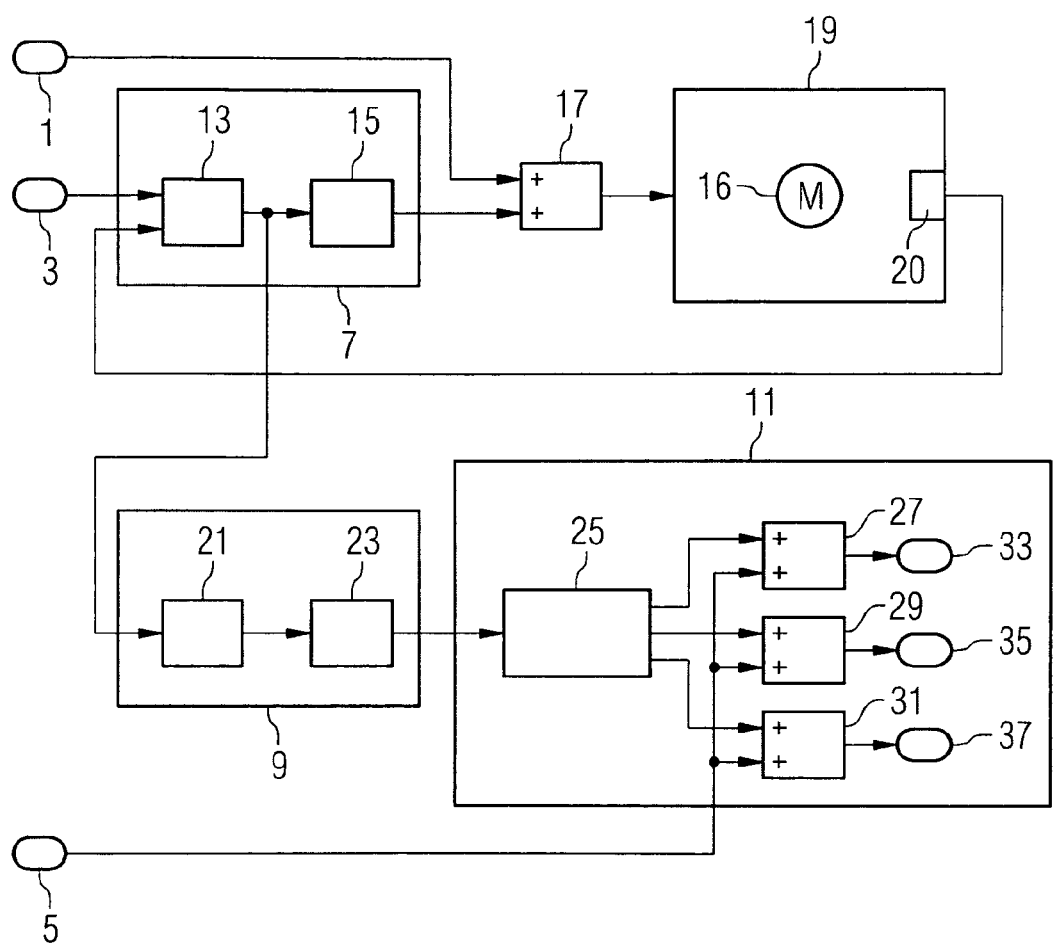
FIG. 1 shows a first control system implementing the inventive method.

A first embodiment of the inventive method and the inventive yaw system will be described with respect to FIG. 1. FIG. 1 shows a control system comprising three inputs 1, 3, 5 with the first input receiving a signal representing an aerodynamic torque acting on the rotor when the horizontal rotor axis is misaligned, i.e. a yaw angle occurs. The second input 3 receives a yaw speed reference signal which represents the yaw speed, i.e. the change in the yaw angle, by which the horizontal rotor axis of the rotor shall be rotated to achieve an alignment with the wind direction, i.e. to reduce the yaw angle. The third input receives a common pitch reference signal which sets a common pitch angle for each rotor blade of the wind turbine's rotor. Such a common pitch signal is used to control the power output of the wind turbine.

The control system further comprises a yaw system controller with a yaw drive controller 7 and a yaw motor load controller 9. It further comprises a pitch controller 11 for controlling the pitch angle of the rotor blades. The yaw motor controller is used to align the horizontal rotor axis with the wind direction. It comprises a yaw speed controller 13 which receives the yaw speed reference signal from the input 3 and a yaw speed signal representing the actual yaw speed of the rotor, i.e. the angular speed of the turning horizontal rotor axis. On the basis of both signals the yaw speed controller 13 establishes and outputs a torque reference signal. The torque reference signal represents a torque which is to be applied to the rotor in order to turn it with the desired speed, i.e. a desired angular velocity of the horizontal rotor axis, in order to achieve alignment with the wind direction.

The yaw drive controller 7 further comprises a yaw torque controller 15 which is connected to the yaw speed controller 13 to receive the torque reference signal. On the basis of the torque reference signal the yaw torque controller 15 establishes a drive torque signal, i.e. a signal representing the actual drive torque to be provided by at least one yaw drive of the yaw system. The drive torque signal is then output by the yaw motor controller.

The yaw drive is, in the present embodiment, implemented as an electrical motor. Therefore, the drive torque signal would represent an electrical power to be applied to the motor in order to provide the desired torque. Furthermore, the torque reference signal could represent an electrical power. The motor torque then adds to the aerodynamic torque as indicated by the adder 17 to provide a yaw torque finally actuating the yaw system 19 of the wind turbine, i.e. turning the horizontal rotor axis of the rotor, with a certain yaw speed.

The actual yaw speed of the rotor is measured by a yaw speed sensor (not shown in the figure) and fed back to the yaw speed controller 13 in the yaw motor controller 7.

Once the horizontal rotor axis is aligned with a wind speed the yaw speed signal output by the yaw speed sensor should be zero. However, due to turbulence in the wind field there will only be an average value of zero yaw speed if the overall wind direction does not change. Such turbulence causes fluctuations in the yaw speed since it provides aerodynamic torque acting on the rotor. As a consequence, the yaw speed signal input to the yaw speed controller 13 deviates from the yaw speed reference signal, which is zero in case of alignment between the horizontal rotor axis and the wind direction, so that the yaw speed controller 13 provides a torque reference signal even if the overall wind direction does not change. The torque reference signal represents a torque to be provided by the at least one drive motor 16 of the yaw system 19 in order to follow the fluctuations. Following each fluctuation would lead to excessive control action which in turn increases wear of the yaw system. On the other hand, the fluctuations induced by a turbulent wind field usually do not change the average wind direction so that a realignment of the horizontal rotor axis with the average wind direction is not necessary. Therefore, measures for braking the yaw system or providing retaining torques are taken in the state of the art. In the present invention, however, such measures are generally not necessary. Instead, the torque reference signal output by the yaw speed controller 13 is fed as an error signal to the input of the yaw drive load controller 9 which then establishes and outputs a horizontal cyclic pitch signal which represents individual pitches to be set at the rotor blades of the rotor in order to reduce the aerodynamic torque induced by turbulence in the wind field.

The yaw drive load controller 9 comprises a low pass filter 21 the input of which receives the error signal, i.e. the torque reference signal from the yaw speed controller 13. The low pass filter 21 is used to attenuate high frequencies in the torque reference signal in order to discard frequency components in the torque reference signal which cannot be followed by the pitch system of the rotor. The low pass filter 21 then outputs a filtered error signal to a PI controller 23 (proportional/integral controller) of the yaw drive load controller 9. The PI controller 23 establishes the actual horizontal cyclic pitch reference signal on the basis of the filtered error signal which it receives from the low pass filter 21. While the proportional part of the PI controller accounts for following the higher frequencies in the filtered error signal the integral part of the PI controller accounts for following the lower frequencies in the filtered error signal. The established horizontal cyclic pitch reference signal is output to the pitch controller 11 of the wind rotor's pitch system.

The pitch controller 11 comprises a modulator 25, three adders 27, 29, 31 and three signal outputs 33, 35, 37. Hence, there is, in the present embodiment, an adder and a signal output for each rotor blade of a three bladed rotor. Of course, if a different number of blades are used in the rotor the number of adders and signal outputs would be adapted to the number of rotor blades. If, for example, a two-bladed rotor would be used instead of a three-bladed rotor, two adders and two signal outputs would be sufficient.

In the pitch controller 11 the modulator 25 receives the horizontal, cyclic pitch reference signal from the PI controller 23 of the yaw drive load controller 9 and modulates the signal into an individual horizontal cyclic pitch signal for each turbine blade. These signals are then output to the respective adders 27, 29, 31 where a common pitch reference signal, which is used to control the power output of the wind turbine, is added to the individual horizontal cyclic pitch signals. The sum of an individual horizontal cyclic pitch signal and the common pitch reference signal is then output to the respective pitch drive of the rotor's pitch system which sets the pitch of the corresponding rotor blade accordingly.

By setting the individual pitches of the rotor blades according to individual horizontal cyclic pitch signals the aerodynamic torques acting on the yaw system 19 are counteracted by aerodynamic measures so that the yawing moments in the yaw system are greatly reduced. Therefore, the yaw system does not need to be able to provide high retaining torques or retaining frictions.

A second example of a control system which uses an inventive yaw system controller by which the inventive method is implemented will now be described with respect to FIG. 2. The components of the control system do not differ from the control system components shown in FIG. 1. They are therefore designated the same reference numerals and will not be described again in order to avoid unnecessary repetition. The description of the second example will therefore concentrate on the difference from the first example.

Figure 2:
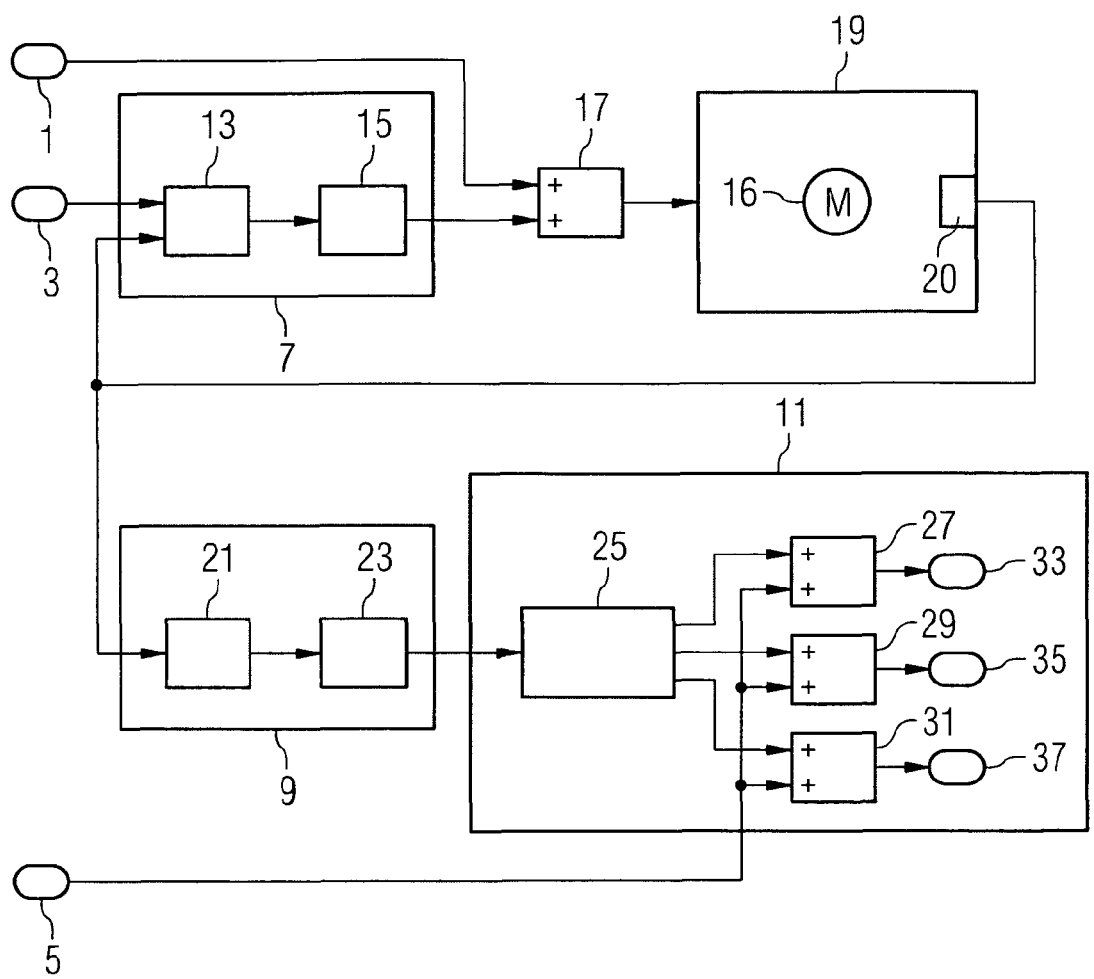
FIG. 2 shows a second example of a control system implementing the inventive method.

The difference between the control system shown in FIG. 2 and the control system shown in FIG. 1 lies in that the error signal which is input to the yaw drive load controller 9 is the yaw speed signal provided by the yaw speed sensor rather than the torque reference signal provided by the yaw speed controller 13. As the torque reference signal represents a retaining torque to be applied in order to keep the horizontal rotor axis aligned, the yaw speed signal represents a measure for the aerodynamic torques (aerodynamic moments) acting on the yaw system 19. If, for example, the yaw system comprises means for providing a fixed retaining torque or a fixed retaining friction then the yaw speed will provide a measure for the degree by which the aerodynamic torque exceeds the retaining torque or the retaining friction since the angular velocity increases proportionally to the degree by which the aerodynamic moment exceeds the retaining torque or the torque provided by the retaining friction. Therefore, the yaw speed signal is as good an error signal for calculating a horizontal cyclic pitch signal as the torque reference signal. The same holds if an adjustable retaining torque or an adjustable retaining friction is provided and the aerodynamic torque exceeds the maximum retaining torque or the maximum retaining friction which can be provided by the yaw system.

Alternatively, a yaw position signal representing a yaw position of the horizontal rotor axis could be used as well as an error signal since the yaw position also depends well defined from the degree by which the aerodynamic torque exceeds the retaining torque or the torque provided by the retaining friction.

A third example of a control system which uses an inventive yaw system controller by which the inventive method is implemented will now be described with respect to FIG. 3. In the control system shown in FIG. 3 the yaw drive controller 7, the yaw drive load controller 9, the adder 17 and the inputs 1, 3, 5 do not differ from the respective elements shown in FIG. 1. They will therefore not be described again to avoid unnecessary repetition and have been designated the same reference numerals as in FIG. 1. In addition, as in FIG. 1, the torque reference signal output by the yaw speed controller 13 is used as the error signal input to the yaw drive load controller 9.

Figure 3:
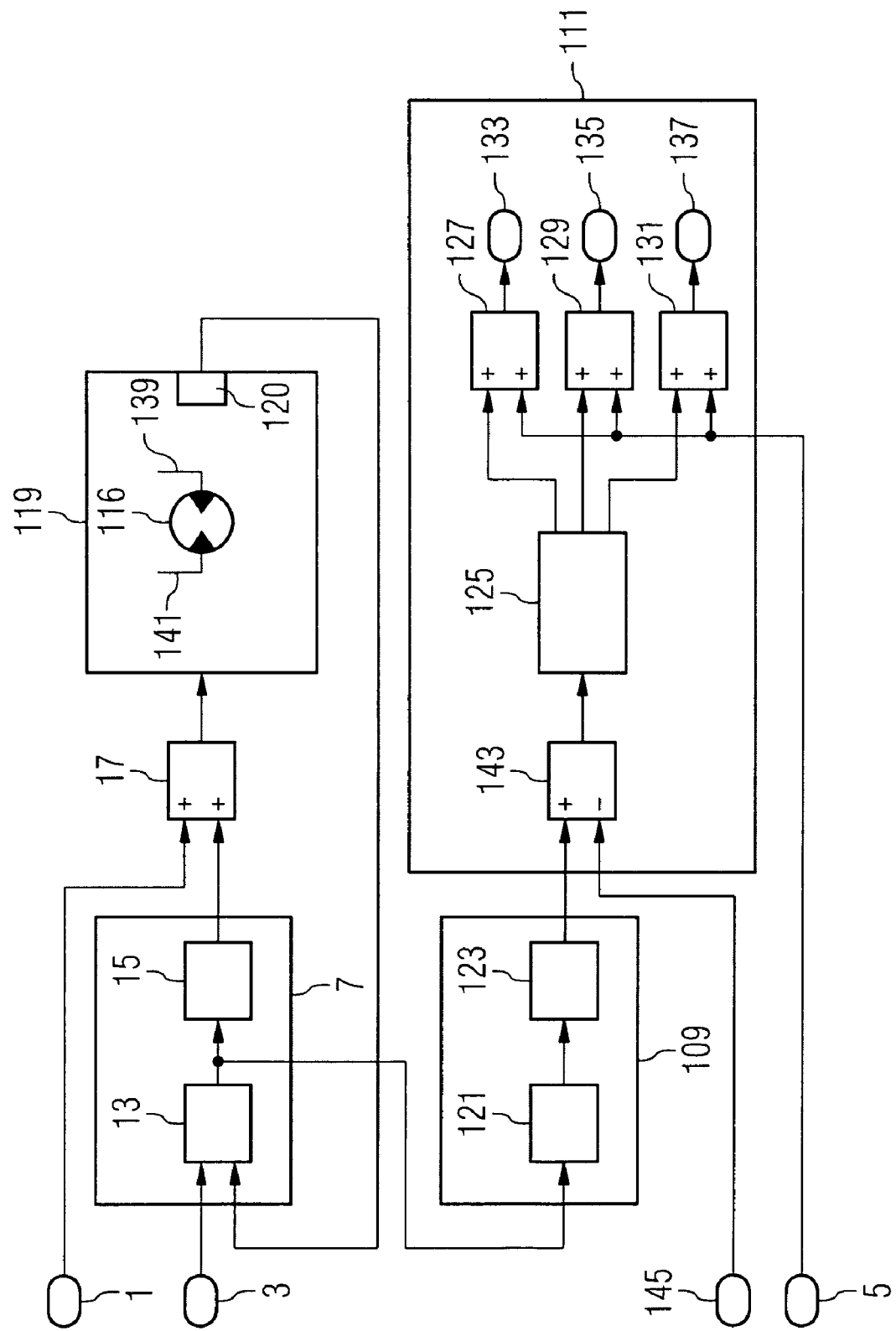
FIG. 3 shows a third example of a control system implementing the inventive method.

The control system shown in FIG. 3 differs from the control system shown in FIGS. 1 and 2 in that the yaw system 119 is, in the present example, a hydraulic yaw system rather than an electric yaw system. Therefore, the motor torque signal output by the yaw drive controller 7 may represent a hydraulic pressure difference which is to be applied between a hydraulic fluid input 139 and a hydraulic fluid output 141 of the at least one hydraulic motors 116. The torque reference signal could then also represent a reference for the pressure difference to be applied. However, the yaw system used in the example shown in FIG. 3 could also be an electric yaw system as it has been in the examples shown in FIGS. 1 and 2. On the other hand, the examples shown in FIGS. 1 and 2 could also be implemented with a hydraulic yaw system rather than an electric yaw system.

The main difference of the control system shown in FIG. 3 to the control system shown in FIG. 1 lies in the design of the yaw drive load controller 109 and the pitch controller 111. As in FIG. 1, the yaw drive load controller 109 comprises a low pass filter 121, which is identical to the low pass filter 21 in FIG. 1, and a PI controller 123. In contrast to the example shown in FIG. 1, the PI controller does not output a horizontal cyclic pitch reference signal but a horizontal blade load reference signal. The horizontal blade load reference signal represents a 1P load which is a load which oscillates with a frequency corresponding to the rotational frequency of the rotor and which is to be induced to rotor blades during one revolution of the rotor such as to induce a torque counteracting the aerodynamic torque trying to move the rotor out of alignment with the wind direction. This 1P bladed load reference signal is output to the pitch controller.

The pitch controller 111 comprises a cyclic pitch blade load controller 125, three adders 127, 129, 131 and three outputs 133, 135, 137. In addition, the pitch controller comprises a fourth adder 143. In addition, the controller system shown in FIG. 3 comprises a fourth input 145 which receives a 1P blade load signal representing the actual load acting on the rotor blades during one revolution of the rotor. This input signal is fed as a negative input to the adder 143 which also receives the 1P blade load reference signal as a positive input from the yaw drive load controller 109. The cyclic pitch blade load controller 125 then receives the difference between the 1P blade load reference signal and the 1P blade load signal from the adder 143. This difference represents the resulting blade load which is to be counteracted through cyclic pitch signals for each rotor blade of the rotor in order to reduce the load on the rotor blades. Then, the cyclic pitch blade load controller 125 establishes individual cyclic pitch signals which are then output to the adders 127, 129, 131. In these adders, the common pitch reference signal received through the third input 5 is added to the individual cyclic pitch signals and the result is output to the pitch drives of the rotor blades through the outputs 133, 135, 137.

With the control system shown in FIG. 3 not only yawing moments acting on the yaw system can be counteracted but also loads acting on the rotor.

Figure 4:
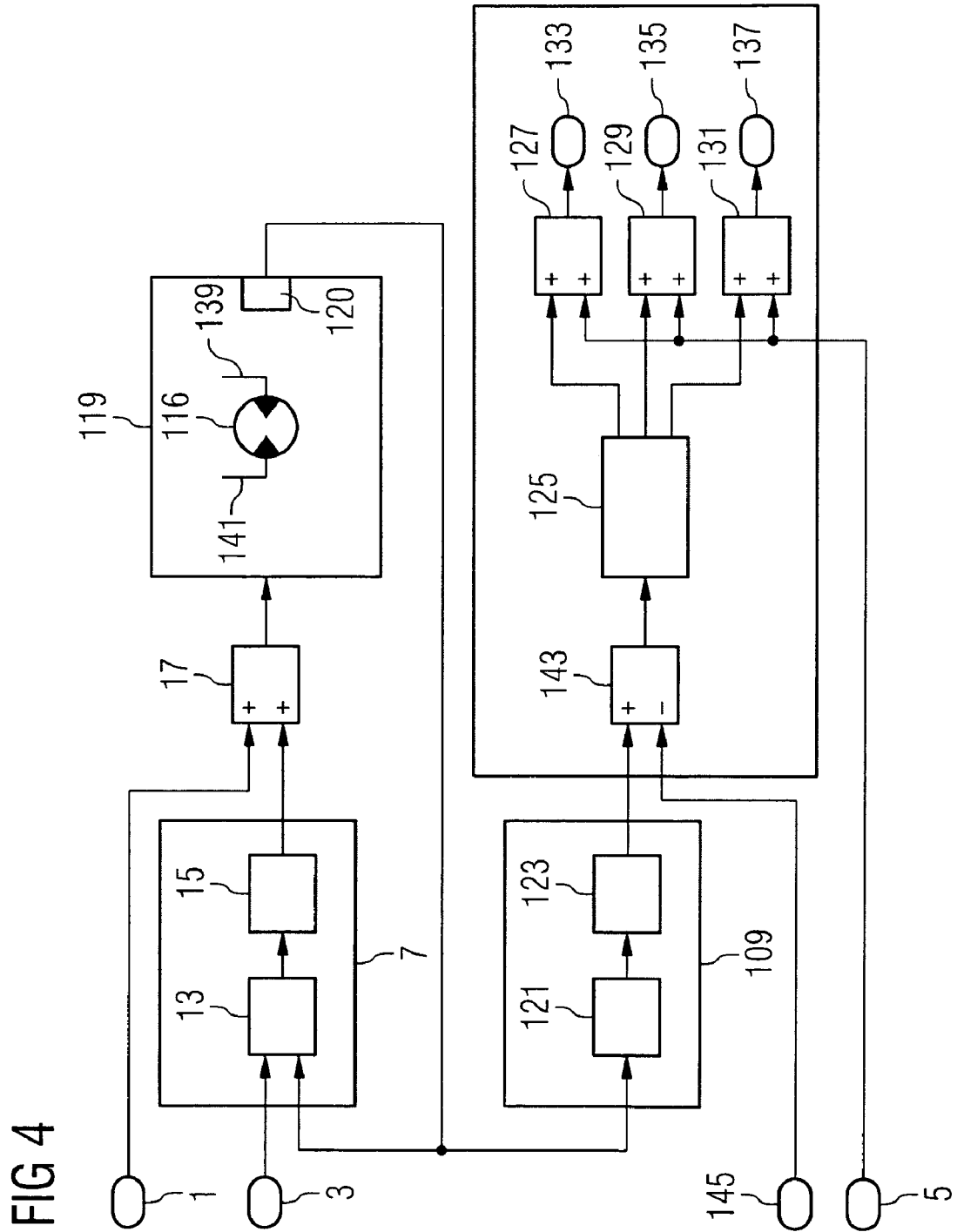
FIG. 4 shows a fourth example of a control system implementing the inventive method.

A fourth example of a control system which uses an inventive yaw system controller by which the inventive method is implemented is shown in FIG. 4. The components of the system shown in FIG. 4 do not differ from the components of the system shown in FIG. 3 and are therefore designated the same reference numerals and will not be explained again to avoid unnecessary repetition. The description of the control system shown in FIG. 4 will rather concentrate on the difference to the control system shown in FIG. 3.

The difference of the control system shown in FIG. 4 to the control system shown in FIG. 3 lies in that the error input to the yaw drive load controller 109 is the yaw speed signal rather than the torque reference signal. What has been said with respect to using the yaw speed signal as the error signal in the control system shown in FIG. 2 is also valid for the control system shown in FIG. 4. In other respects, the control system shown in FIG. 4 does not differ from the control system shown in FIG. 3.

Figure 5:
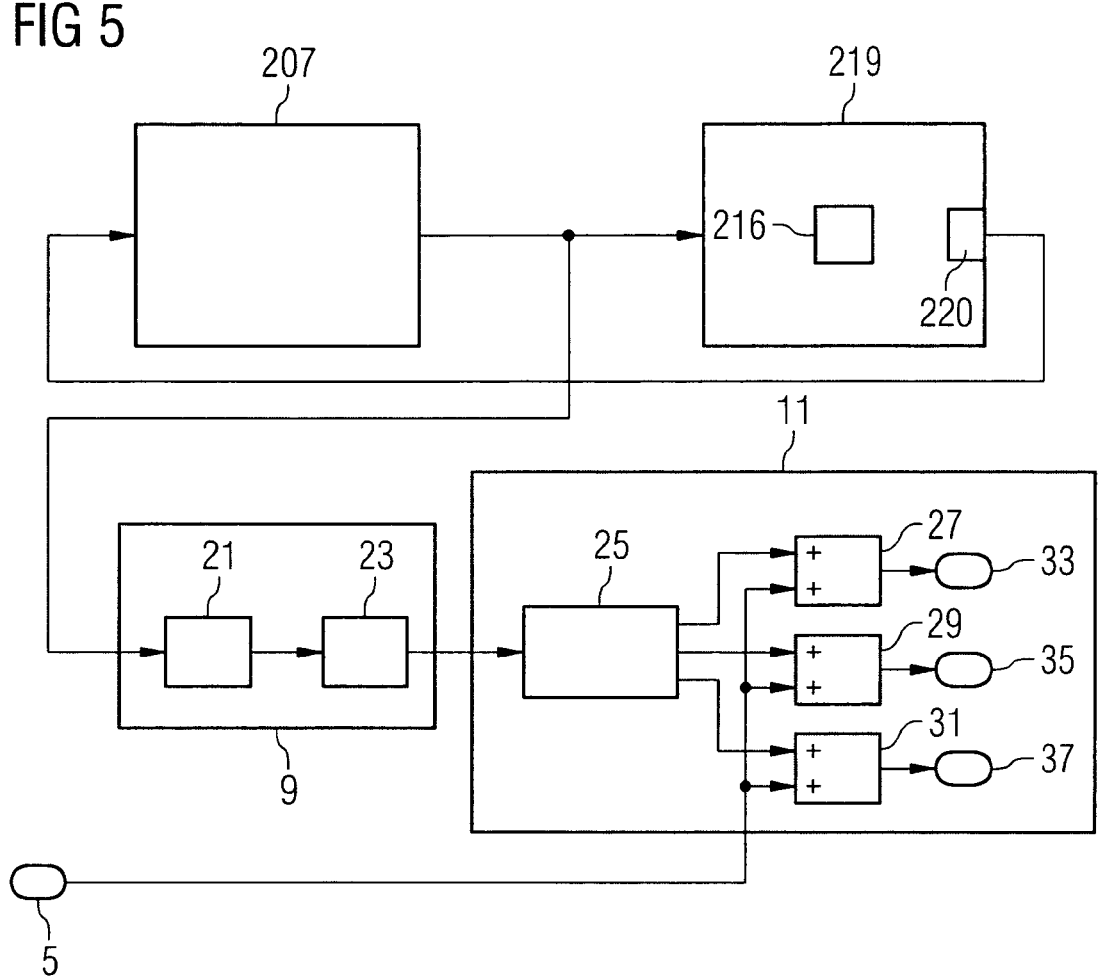
FIG. 5 shows a fifth example of a control system implementing the inventive method.

In a fifth example of a control system which uses an inventive yaw system controller by which the inventive method is implemented is shown in FIG. 5. In this control system a friction signal provided by a friction brake controller 207 and representing a variable friction to be provided by a friction brake 216 of the yaw system 219 in order to keep the horizontal rotor axis aligned with the wind direction is used as error input to the yaw drive load controller 9 instead of the yaw speed signal, the yaw angle signal or the drive torque reference signal. In this control system the yaw drive load controller 9 and the pitch controller 11 do not differ from those shown in FIGS. 1 and 2. The respective elements are therefore designated the same reference numerals as in FIGS. 1 and 2 and will not be described again in order to avoid unnecessary repetition.

The control system shown in FIG. 5 differs from the control systems shown in FIGS. 1 and 2 in that a friction brake controller 207 is present which receives the yaw speed signal from the yaw system's 219 yaw speed sensor 220. On the basis of the yaw speed signal the friction brake controller 207 establishes and outputs a friction signal to the friction brake 216 of the yaw system 219. The friction signal represents a friction to be provided by the friction brake 216 which is adequate to keep the horizontal rotor axis aligned with the wind direction. The friction reference signal is, in the yaw system controller shown in FIG. 5, input as an error signal to the yaw drive load controller 9.

In the embodiment shown in FIG. 5 an electromagnetic friction brake 216 is used. Therefore, the friction signal may represent an electrical power needed by the brake to provide the desired friction. However, as an alternative, a hydraulic friction brake could also be used. Then, the friction signal may represent a hydraulic pressure to be applied to the brake in order to provide the desired friction.

Although not shown in FIG. 5 in order to simplify the figure, the yaw system controller further comprises a yaw drive controller as shown in FIGS. 1 and 2.

Figure 6:
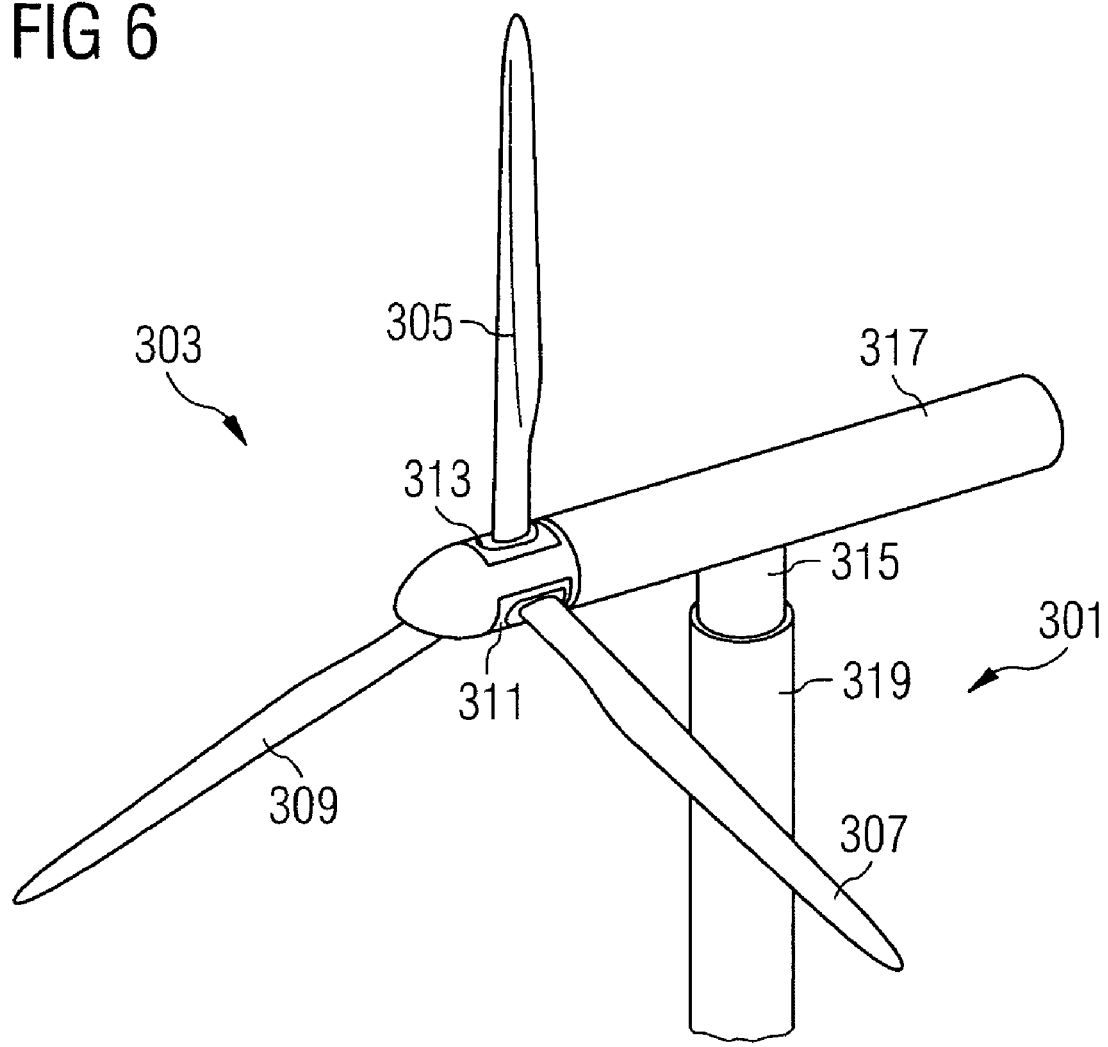
FIG. 6 shows an inventive wind turbine in a highly schematic view.

A wind turbine 301 with an inventive yaw system is shown in a highly schematic view in FIG. 6. This figure shows a wind turbine 301 with a three-bladed rotor 303. At the root end of each rotor blade 305, 307, 309 an actuator is present which allows for setting the pitch of the respective blade. Two of the actuators are indicated by reference numerals 311 and 313. The wind turbine 301 is provided with an inventive yaw system 315, which is indicated by reference numeral 315, which is located between the nacelle 317 and the tower 319 of the wind turbine 301.

A wind turbine with one of the described control systems may be operated with no active application of torque on the yaw drives when the turbine is in operation. The individual pitching of the rotor blades 305, 307, 309 will then be regulated as a function of azimuth position. Alternatively, a small current may be applied to the yaw drive systems to be used as a regulating parameter in case of electrical yaw drives. In case of hydraulic yaw drives the regulating parameter may be a small pressure difference to be applied between the fluid input and fluid output of a yaw drive. Irrespective as to whether the yaw drives are electric or hydraulic drives they may be dimensioned only for service purposes and for use during low wind conditions.

The invention claimed is:

1. A method of reducing loading acting on a wind turbine yaw system due to yawing moments induced to the yaw system by a rotor having a rotor blade with a pitch control system, comprising:
    determining the yawing moment induced to the yaw system by the rotor; and
    setting a pitch of the rotor blade based on the detected yawing moment such that the determined yawing moment is reduced,
    wherein the yawing moment is determined from a yaw system observable,
    wherein the yaw system is aligned by providing torques by a plurality of yaw drives where the torques act in opposite directions, and the yawing moment induced to the yaw system is determined by determining a difference between the torques provided by the yaw drives in order to keep the yaw system aligned.

2. The method as claimed in claim 1, wherein the pitch of each rotor blade of the rotor is individually set to reduce the determined yawing moment.

3. The method as claimed in claim 1, wherein the pitch of the rotor blade is set based on the detected yawing moment only when the detected yawing moment exceeds a predefined value.

4. The method as claimed in claim 1, wherein the plurality of yaw drives are electrical drives and the torques provided by the yaw drives are determined from the electrical power needed by the yaw drives for providing the torques.

5. The method as claimed in claim 1, wherein the plurality of yaw drives are hydraulic drives each provided with a hydraulic fluid input and a hydraulic fluid output and the torques provided by the yaw drives are determined by determining for each yaw drive the difference in the hydraulic pressure at the hydraulic fluid input to the hydraulic pressure at the hydraulic fluid output which is needed by the respective yaw drive for providing the respective torque.

6. A method of reducing loading acting on a wind turbine yaw system due to yawing moments induced to the yaw system by a rotor having a rotor blade with a pitch control system, comprising:
    determining the yawing moment induced to the yaw system by the rotor; and
    setting a pitch of the rotor blade based on the detected yawing moment such that the determined yawing moment is reduced,
    wherein the yawing moment is determined from a yaw system observable,
    wherein the yaw drive provides a retaining torque for keeping the yaw system aligned and the yawing moment induced to the yaw system is determined from the retaining torque which is necessary to keep the yaw system aligned.

7. The method as claimed in claim 6, wherein the yaw drive is an electrical drive and the retaining torque provided by the yaw drive is determined from the electrical power needed by the yaw drive for providing the retaining torque.

8. The method as claimed in claim 6, wherein the yaw drive is a hydraulic drive provided with a hydraulic fluid input and a hydraulic fluid output and the retaining torque provided by the at least one yaw drive is determined from the difference in the hydraulic pressure at the hydraulic fluid input to the hydraulic pressure at the hydraulic fluid output which is needed by the yaw drive for providing the retaining torque.

9. A method of reducing loading acting on a wind turbine yaw system due to yawing moments induced to the yaw system by a rotor having a rotor blade with a pitch control system, comprising:
    determining the yawing moment induced to the yaw system by the rotor; and
    setting a pitch of the rotor blade based on the detected yawing moment such that the determined yawing moment is reduced,
    wherein the yawing moment is determined from a yaw system observable,
    wherein the yaw system is kept aligned by providing a retaining friction and the yawing moment induced to the yaw system is determined by determining the retaining friction necessary to keep the yaw system aligned.

10. The method as claimed in claim 9, wherein the retaining friction is provided by an electromagnetic friction brake and the retaining friction provided by the electromagnetic friction brake is determined from the electrical power needed by the electromagnetic friction brake to provide the retaining friction.

11. The method as claimed in claim 9, wherein the retaining friction is provided by a hydraulic friction brake and the retaining friction provided by the hydraulic friction brake is determined from the hydraulic pressure needed by the hydraulic friction brake to provide the retaining friction.

12. A yaw system controller for a wind turbine having a rotor with a rotor blade and a pitch drive for setting the pitch of the rotor blade, a pitch controller and a yaw system with at least one yaw drive, comprising:
    an error signal input for receiving an error input signal that represents a yawing moment induced to the yaw system by the rotor, and
    a yaw drive load controller output where the yaw drive load controller determines and outputs a horizontal pitch signal through the yaw drive load controller output to the pitch controller of a wind turbine, wherein the horizontal pitch signal is based on the error input signal and represents a pitch to be set by the pitch drive such as to reduce a yawing moment induced to the yaw system by the rotor,
    an error signal deriving device that derives the error signal from a yaw system observable,
    a yaw drive controller that determines and outputs a drive torque signal representing a torque to be provided by the yaw drive,
    the yaw drive controller comprising a yaw speed controller which comprises a yaw speed controller output and which determines and outputs a torque reference signal through the yaw speed controller output, the yaw drive controller further comprises a yaw torque controller connected to the yaw speed controller output to receive the torque reference signal and which is adapted to determine the drive torque signal based on the torque reference signal, and wherein the error signal input of the yaw drive load controller is connected to the yaw speed controller output for receiving the torque reference signal as the error input signal.

13. A yaw system controller for a wind turbine having a rotor with a rotor blade and a pitch drive for setting the pitch of the rotor blade, a pitch controller and a yaw system with at least one yaw drive, comprising:

an error signal input for receiving an error input signal that represents a yawing moment induced to the yaw system by the rotor, and a yaw drive load controller output where the yaw drive load controller determines and outputs a horizontal pitch signal through the yaw drive load controller output to the pitch controller of a wind turbine, wherein the horizontal pitch signal is based on the error input signal and represents a pitch to be set by the pitch drive such as to reduce a yawing moment induced to the yaw system by the rotor, an error signal deriving device that derives the error signal from a yaw system observable, a friction brake controller for controlling the friction provided by a friction brake of a yaw system with a friction brake controller output, where the friction brake controller determines and outputs a friction signal through the friction brake controller output to a friction brake, the friction signal representing a friction to be provided by the friction brake, and where the error signal input of the yaw drive load controller is connected to the friction brake controller output for receiving the friction signal as the error input signal.

14. The yaw system controller as claimed in claim 13, wherein the error signal input of the yaw drive load controller receives a yaw speed signal from a yaw speed detector of the yaw system as the error input signal.

15. The yaw system controller as claimed in claim 14, wherein the yaw drive load controller comprises a PI-controller.

* * * * *